United States Patent
Otaki et al.

(10) Patent No.: US 10,128,675 B2
(45) Date of Patent: Nov. 13, 2018

(54) ALL-SOLID-STATE BATTERY SYSTEM AND METHOD OF MANUFACTURING THE SAME

(71) Applicant: TOYOTA JIDOSHA KABUSHIKI KAISHA, Toyota-shi, Aichi-ken (JP)

(72) Inventors: Mitsutoshi Otaki, Susono (JP); Keisuke Omori, Kariya (JP); Norihiro Ose, Sunto-gun (JP); Hajime Hasegawa, Susono (JP); Kengo Haga, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 15/265,372

(22) Filed: Sep. 14, 2016

(65) Prior Publication Data

US 2017/0077732 A1    Mar. 16, 2017

(30) Foreign Application Priority Data

Sep. 14, 2015 (JP) ................................. 2015-181094
Sep. 13, 2016 (JP) ................................. 2016-179021

(51) Int. Cl.
*H02J 7/00* (2006.01)
*H01M 4/38* (2006.01)
(Continued)

(52) U.S. Cl.
CPC .......... *H02J 7/0068* (2013.01); *H01M 4/131* (2013.01); *H01M 4/134* (2013.01); *H01M 4/386* (2013.01);
(Continued)

(58) Field of Classification Search
CPC ...... H02J 7/0068; H01M 4/131; H01M 4/134; H01M 4/386; H01M 4/485; H01M 4/62;
(Continued)

(56) References Cited

U.S. PATENT DOCUMENTS

| 8,900,749 B2 * | 12/2014 | Yasuda | ................. | H01M 4/134 |
| | | | | 429/218.1 |
| 10,008,712 B2 * | 6/2018 | Onizuka | ............... | H01M 4/366 |

(Continued)

FOREIGN PATENT DOCUMENTS

| CN | 103168383 A | 6/2013 |
| EP | 2294650 B1 | 10/2012 |

(Continued)

*Primary Examiner* — Phallaka Kik
(74) *Attorney, Agent, or Firm* — Oliff PLC

(57) ABSTRACT

An all-solid-state battery system comprising an all-solid-state battery comprising a positive electrode active material layer, a solid electrolyte layer, and a negative electrode active material layer, and a control device configured to control a charge-discharge voltage during use of the all-solid-state battery. The negative electrode active material layer includes alloy negative electrode active material particles. The amorphization degree of the alloy negative electrode active material particles is in the range of 27.8% to 82.8% and a ratio Z/W is in the range of 0.32 to 0.60, where Z is a controlled discharge capacity of the all-solid-state battery, and W is a theoretical capacity of the alloy negative electrode active material particles×a total weight of the alloy negative electrode active material particles×the amorphization degree.

10 Claims, 4 Drawing Sheets

(51) Int. Cl.

| | | |
|---|---|---|
| *H01M 4/62* | (2006.01) | |
| *H01M 10/052* | (2010.01) | |
| *H01M 10/0562* | (2010.01) | |
| *H01M 10/0585* | (2010.01) | |
| *H01M 10/42* | (2006.01) | |
| *H01M 10/44* | (2006.01) | |
| *H01M 4/131* | (2010.01) | |
| *H01M 4/134* | (2010.01) | |
| *H01M 4/485* | (2010.01) | |
| *H01M 10/0525* | (2010.01) | |
| *H01M 10/058* | (2010.01) | |
| *H01M 4/36* | (2006.01) | |
| *H01M 4/505* | (2010.01) | |
| *H01M 4/525* | (2010.01) | |
| *H01M 4/02* | (2006.01) | |

(52) U.S. Cl.
CPC ............ *H01M 4/485* (2013.01); *H01M 4/62* (2013.01); *H01M 10/052* (2013.01); *H01M 10/058* (2013.01); *H01M 10/0525* (2013.01); *H01M 10/0562* (2013.01); *H01M 10/0585* (2013.01); *H01M 10/425* (2013.01); *H01M 10/44* (2013.01); *H01M 10/446* (2013.01); *H01M 4/366* (2013.01); *H01M 4/505* (2013.01); *H01M 4/525* (2013.01); *H01M 2004/027* (2013.01); *H01M 2004/028* (2013.01)

(58) Field of Classification Search
CPC ...... H01M 4/366; H01M 4/505; H01M 4/525; H01M 10/052; H01M 10/0525; H01M 10/0562; H01M 10/058; H01M 10/0585; H01M 10/425; H01M 10/446; H01M 2004/027; H01M 2004/028
USPC .................................................. 320/128, 107
See application file for complete search history.

(56) References Cited

U.S. PATENT DOCUMENTS

| | | | | |
|---|---|---|---|---|
| 2001/0031398 | A1* | 10/2001 | Hashimoto | C22C 1/0416 429/218.1 |
| 2002/0055041 | A1* | 5/2002 | Kobayashi | H01M 4/13 429/221 |
| 2009/0123844 | A1* | 5/2009 | Morigaki | H01M 4/06 429/231.95 |
| 2010/0015514 | A1* | 1/2010 | Miyagi | H01M 4/131 429/129 |
| 2011/0171502 | A1 | 7/2011 | Kottenstette et al. | |
| 2012/0094185 | A1 | 4/2012 | Tsuchida et al. | |
| 2013/0164621 | A1* | 6/2013 | Yasuda | H01G 11/06 429/218.1 |
| 2013/0244118 | A1* | 9/2013 | Onizuka | H01M 4/366 429/231.8 |
| 2014/0234717 | A1 | 8/2014 | Christensen et al. | |
| 2015/0125752 | A1* | 5/2015 | Nishimura | C01B 31/02 429/231.4 |
| 2016/0149213 | A1* | 5/2016 | Park | H01M 4/386 429/221 |
| 2016/0329561 | A1* | 11/2016 | Park | H01M 4/134 |
| 2016/0372745 | A1* | 12/2016 | Choi | H01M 4/386 |
| 2018/0175380 | A1* | 6/2018 | Park | C01B 33/037 |
| 2018/0190975 | A1* | 7/2018 | Ishii | C01B 33/02 |
| 2018/0190977 | A1* | 7/2018 | Park | H01M 4/366 |

FOREIGN PATENT DOCUMENTS

| | | | |
|---|---|---|---|
| JP | 2013-539594 A | | 10/2013 |
| JP | 2014-041783 A | | 3/2014 |
| JP | 2014-086218 A | | 5/2014 |
| JP | 2016100329 A | * | 5/2016 |
| JP | 2016106376 A | * | 6/2016 |
| KR | 10-2012-0016079 A | | 2/2012 |
| KR | 10-2014-0060544 A | | 5/2014 |
| WO | 2012/030639 A2 | | 3/2012 |
| WO | 2013/137224 A1 | | 9/2013 |

* cited by examiner

ALL-SOLID-STATE BATTERY SYSTEM AND METHOD OF MANUFACTURING THE SAME

INCORPORATION BY REFERENCE

The disclosure of Japanese Patent Application No. 2015-181094 filed on Sep. 14, 2015 and Japanese Patent Application No. 2016-179021 filed on Sep. 13, 2016 including the specification, drawings and abstract is incorporated herein by reference in its entirety.

BACKGROUND

1. Technical Field

This application relates to an all-solid-state battery system and a method of manufacturing the same.

2. Description of Related Art

Currently, among various batteries, lithium ion batteries have attracted attention from the viewpoint of obtaining high energy density. Among the lithium ion batteries, in particular, an all-solid-state battery in which a liquid electrolyte is replaced with a solid electrolyte has attracted attention. The reason for this is as follows. Unlike secondary batteries in which a liquid electrolyte is used, in the all-solid-state battery, the electrolyte is solid, and a battery is composed of only solid. Therefore, for example, the decomposition of a liquid electrolyte does not occur, and cycle characteristics and energy density are expected to be high. Examples of a negative electrode active material which is generally used in a lithium ion battery include a carbon negative electrode active material such as graphite, soft carbon, or hard carbon. Recently, instead of the carbon electrode, an alloy negative electrode active material having a higher capacity has been studied. Examples of the alloy negative electrode active material include silicon, tin, germanium, and aluminum. Among these, in particular, silicon particles have attracted attention from the viewpoint of obtaining high capacity.

It is known that a battery in which an alloy negative electrode active material is used as a negative electrode active material has lower cycle characteristics than a battery in which a carbon negative electrode active material or the like is used as a negative electrode active material. The reasons for this are, for example, as follows: alloy negative electrode active material particles are pulverized by expansion and shrinkage during charging and discharging; and the internal resistance of an all-solid-state battery increases due to the formation of voids between alloy negative electrode active material particles and other negative electrode active material layer materials.

Japanese Patent Application Publication No. 2014-086218 (JP 2014-086218 A) discloses an all-solid-state battery in which silicon particles are used as an alloy negative electrode active material. In this all-solid-state battery, by adjusting the volume change amount of the silicon particles during charging and discharging, the crushing of the silicon particles and the formation of voids between the silicon particles and other negative electrode active material layer materials are reduced, thereby suppressing an increase in the internal resistance of the all-solid-state battery.

Japanese Patent Application Publication No. 2014-041783 (JP 2014-041783 A) discloses an all-solid-state battery in which silicon particles are used as an alloy negative electrode active material. By charging this all-solid-state battery at a lower voltage than under normal conditions once during the initial charging and discharging, the silicon particles are activated, and the utilization ratio thereof is improved. Further, JP 2014-041783 A discloses a method of favorably joining the silicon particles and other negative electrode active material layer materials to each other.

The all-solid-state battery in which alloy negative electrode active material particles are used as a negative electrode active material has a problem of low cycle characteristics due to the following reasons: the alloy negative electrode active material particles are pulverized by expansion and shrinkage during charging and discharging; and voids are formed between the alloy negative electrode active material particles and other negative electrode active material layer materials.

Therefore, in order to solve the above-described problems, a method of improving cycle characteristics of an all-solid-state battery in which alloy negative electrode active material particles are used as a negative electrode active material, is required. Specifically, for example, as disclosed in JP 2014-086218 A, in a case where silicon particles are used as alloy negative electrode active material particles, a method of improving cycle characteristics by adjusting the volume change amount of the silicon particles to reduce the resistance may be considered.

However, even in a case where the volume change amount is adjusted as disclosed in JP 2014-086218 A, cycle characteristics deteriorate. This result may imply not only the crushing of the silicon particles during expansion and shrinkage but also the progress of some chemical deterioration.

Accordingly, a technique of further improving cycle characteristics is required.

SUMMARY

The disclosed embodiments provide an all-solid-state battery system in which cycle characteristics are improved, and a method of manufacturing the same.

In a first embodiment, there is provided an all-solid-state battery system comprising an all-solid-state battery comprising a positive electrode active material layer, a solid electrolyte layer, and a negative electrode active material layer including alloy negative electrode active material particles having an amorphization degree in the range of 27.8% to 82.8%, and a control device configured to control a charge-discharge voltage during use of the all-solid-state battery. A ratio Z/W is in the range of 0.32 to 0.60, where Z is a controlled discharge capacity of the all-solid-state battery, and W is a theoretical capacity of the alloy negative electrode active material particles×a total weight of the alloy negative electrode active material particles×the amorphization degree.

The alloy negative electrode active material particles may be silicon particles.

The positive electrode active material layer may include positive electrode active material particles, and at least a part of at least some of the positive electrode active material particles may be coated with a lithium-containing metal oxide protective coating.

The lithium-containing metal oxide may be lithium niobate.

A thickness of the solid electrolyte layer may be in the range of 0.1 μm to 300 μm.

A median primary particle size of the alloy negative electrode active material particles may be 10 μm or less measured using the laser diffraction scattering particle size distribution method.

The ratio Z/W may be in the range of 0.37 to 0.53.

The amorphization degree may be in the range of 35% to 75%.

The control device may be configured to control the charge-discharge voltage to be in a range of 2.50 V to 4.40 V. The control device may be configured to control the charge-discharge voltage to be in a range of 3.00 V to 4.00 V.

In a another embodiment, there is provided a method of manufacturing an all-solid-state battery system, the all-solid-state battery system comprising an all-solid-state battery and a control device, the all-solid-state battery comprising a positive electrode active material layer, a solid electrolyte layer, and a negative electrode active material layer including alloy negative electrode active material particles, the control device being configured to control a charge-discharge voltage during use of the all-solid-state battery. The method comprises laminating the positive electrode active material layer, the solid electrolyte layer, and the negative electrode active material layer including the alloy negative electrode active material particles, and performing initial charging of the all-solid-state battery to an initial charge voltage that is higher than the charge-discharge voltage.

The alloy negative electrode active material particles may be silicon particles.

The charge-discharge voltage may be in the range of 2.50 V to 4.40 V, and the initial charge voltage may be in the range of higher than 4.45 V and 5.00 V or lower.

The initial charge voltage may be in the range of 4.60 V to 4.70 V.

The positive electrode active material layer may include a positive electrode active material coated with a lithium-containing metal oxide protective coating.

The lithium-containing metal oxide may be lithium niobate.

The initial charging may be performed so that a value obtained by dividing (a) a change ratio of a charge amount to an upper limit charge voltage during the initial charging by (b) an average change ratio of a charge amount to a charge voltage in the range of 4.00 V to 4.40 V is more than 1.3.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
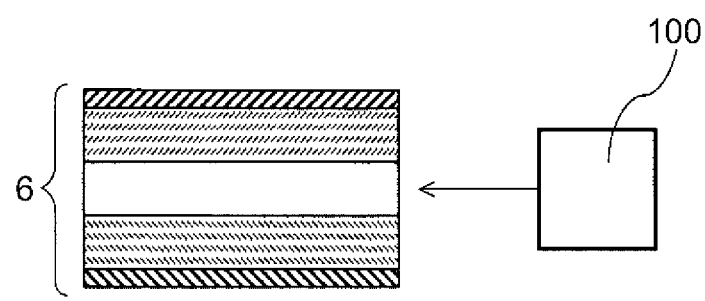
FIG. 1 is a diagram showing an example of an all-solid-state battery system according to an embodiment.

Hereinafter, an embodiment will be described in detail. It is not intended that the disclosure be limited to the following embodiment.

All-Solid-State Battery System According to an Embodiment

An all-solid-state battery system according to a first embodiment includes: an all-solid-state battery that includes a positive electrode active material layer, a solid electrolyte layer, and a negative electrode active material layer; and a control device that controls a charge-discharge voltage during use of the all-solid-state battery. The negative electrode active material layer contains alloy negative electrode active material particles. An amorphization degree of the alloy negative electrode active material particles is 27.8% to 82.8% and satisfies the following conditions:

$0.32 \leq Z/W \leq 0.60$, where

Z: a controlled discharge capacity (mAh) of the all-solid-state battery, and

W: a theoretical capacity (mAh/g) of the alloy negative electrode active material particles×a total weight (g) of the alloy negative electrode active material particles×the amorphization degree (%).

The amorphization degree refers to a ratio of the mass of an amorphous portion to the total mass of the alloy negative electrode active material particles.

In this expression, the controlled discharge capacity Z of the all-solid-state battery refers to the discharge capacity in an actual voltage range controlled by the control device in the all-solid-state battery system which is completed as a product.

In other words, in this expression, the controlled discharge capacity Z of the all-solid-state battery indicates the amount of lithium in which the completed all-solid-state battery can discharge during discharging in the voltage range, which is controlled by the control device, when initially charged and discharged, that is, when initially charged and discharged during normal use.

In this expression, the theoretical capacity (mAh/g) of the alloy negative electrode active material particles is a value which is calculated using the expression nF/M, wherein n represents the amount of electrons (mol) when the alloy negative electrode active material particles stores lithium as much as possible, F represents a Faraday constant (C/mol), and M represents the molecular weight (g/mol).

In other words, the theoretical capacity W of the alloy negative electrode active material particles indicates the total amount of lithium which can be theoretically stored in the amorphous portion of the alloy negative electrode active material particles.

Accordingly, this expression shows that the amount of lithium, which is stored in the negative electrode active material layer after the battery is charged and can be discharged by discharging, is less than the total amount of lithium which can be theoretically stored in the amorphous portion of the alloy negative electrode active material particles and is in a predetermined range.

In a case where the value of Z/W is less than 0.32, the energy density, and the performance, decrease as the battery deteriorates. On the other hand, in a case where the value of Z/W is more than 0.60, when the all-solid-state battery is charged and discharged, it is presumed that a ratio of the amorphous portion of the alloy negative electrode active material particles to a crystalline portion of the expanded and shrunken alloy negative electrode active material particles increases and that the alloy negative electrode active material particles are likely to be crushed by stress.

Regarding the value of Z/W, the lower limit may be 0.33 or more, 0.35 or more, 0.37 or more, 0.40 or more, 0.42 or more, or 0.45 or more, and the upper limit may be 0.58 or less, 0.55 or less, 0.53 or less, 0.50 or less, or 0.48 or less.

By satisfying the above-described conditions, the all-solid-state battery according to this embodiment can realize satisfactory cycle characteristics. FIG. 1 is a diagram showing an example of the all-solid-state battery system according to this embodiment. The all-solid-state battery system according to this embodiment includes: an all-solid-state battery 6; and a control device 100 that controls a charge-discharge voltage during use of the all-solid-state battery.

Without intending to be bound by theory, the improvement of the cycle characteristics of the all-solid-state battery system according to the this embodiment is presumed to occur as follows.

When the lithium ion secondary battery is initially charged by using the alloy negative electrode active material particles as a negative electrode active material, lithium ions released from a positive electrode active material react with the alloy negative electrode active material particles to form an alloy of the alloy negative electrode active material and lithium. In this reaction, a crystalline structure in the alloy negative electrode active material particles collapses, and the alloy negative electrode active material which reacts with lithium is amorphized. Further, when the battery is discharged from this state, the alloy of the alloy negative electrode active material and lithium release lithium in the form of lithium ions so as to return the alloy negative electrode active material. However, the amorphous portion of the alloy negative electrode active material maintains the amorphous structure as it is without returning to a crystalline structure before the initial charging. During the next charging, mainly, this amorphous portion reacts with lithium ions to form an alloy of the alloy negative electrode active material and lithium.

In a case where the all-solid-state battery in which the alloy negative electrode active material particles are used as a negative electrode active material is initially charged, this amorphous portion occurs not in all of the alloy negative electrode active material particles but in a part of the alloy negative electrode active material particles, and the other portions maintain crystallinity without reacting with lithium.

In an all-solid-state battery of the related art, the area of an amorphous portion of alloy negative electrode active material particles is small. Therefore, since the amorphous portion and lithium react with each other preferentially during charging and discharging, a part of the amorphous portion locally expands or shrinks. Accordingly, the volume expansion or shrinkage coefficient of the amorphous portion increases. Therefore, a part of the alloy negative electrode active material particles repeatedly expand and shrink due to repeated charging and discharging, and the alloy negative electrode active material particles are crushed by stress or the like generated between an alloy portion of the alloy negative electrode active material particles which is obtained by a reaction with lithium ions and a non-alloy portion of the alloy negative electrode active material particles which does not react with lithium ions.

On the other hand, in this embodiment, by increasing the area of the amorphous portion, a local reaction with lithium can be prevented, and by reducing the reaction amount of lithium at each position of the amorphous portion, the volume expansion coefficient of the amorphous portion can be reduced. As a result, stress applied to the alloy negative electrode active material particles is reduced, the crushing of the alloy negative electrode active material particles is suppressed, and the cycle characteristics of the all-solid-state battery can be improved. It is presumed that, due to the change in the volume expansion coefficient of the amorphous portion, the progress of chemical deterioration may be suppressed.

The amorphization degree of the alloy negative electrode active material particles is 27.8% to 82.8%.

It is presumed that in order to improve the cycle characteristics of the all-solid-state battery, it is more preferable that a part of the alloy negative electrode active material particles are crystalline rather than a case where all of the alloy negative electrode active material particles are amorphized. The reason for this is presumed to be as follows: the crystalline portion in the alloy negative electrode active material particles functions as a core to stabilize the entire structure of the particles.

<Positive Electrode Active Material Layer>

In this embodiment, the positive electrode active material layer contains a positive electrode active material and optionally further contains a binder, a conductive additive, and a solid electrolyte.

The positive electrode active material is not particularly limited as long as it is a material which is used as a positive electrode active material for a lithium secondary battery. For example, lithium cobalt oxide, lithium nickel oxide, lithium nickel manganese cobalt oxide, lithium manganese oxide, a different element-substituted Li—Mn spinel, lithium titanate, a lithium metal phosphate having a composition represented by $LiMPO_4$ (M represents one or more elements selected from the group consisting of Fe, Mn, Co, and Ni), or a combination thereof can be used.

The positive electrode active material may be coated with a protective coating which is a lithium-containing metal oxide containing lithium as a component. As a result, the formation of an oxide film caused by a reaction of the positive electrode active material and the solid electrolyte is prevented, and the deterioration of the positive electrode active material can be prevented.

The lithium-containing metal oxide is not particularly limited as long as it is a material which has lithium ion conductivity and can maintain the form of a coating layer so as not to flow even after the contact with the positive electrode active material or the solid electrolyte. For example, lithium niobate ($LiNbO_3$), lithium titanate ($Li_4Ti_5O_{12}$), or lithium phosphate ($Li_3PO_4$) can be used.

As the solid electrolyte, a sulfide solid electrolyte which is used as a solid electrolyte for an all-solid-state battery can be used. Examples of the solid electrolyte include, but are not limited to, $Li_2S$—$SiS_2$, $LiI$—$Li_2S$—$P_2S_5$, $LiI$—$Li_3PO_4$—$P_2S_5$, and $Li_2S$—$P_2S_5$.

The binder is not particularly limited, and examples thereof include, but are not limited to, a polymer resin such as polyvinylidene fluoride (PVDF), polytetrafluoroethylene (PTFE), polyimide (PI), polyamide (PA), polyamide imide (PAI), butadiene rubber (BR), styrene-butadiene rubber (SBR), nitrile-butadiene rubber (NBR), styrene-ethylene-butylene-styrene block copolymer (SEBS), or carboxymethyl cellulose (CMC), and combinations thereof.

Examples of the conductive additive include, but are not limited to, a carbon material such as VGCF, acetylene black, Ketjen black, carbon nanotube (CNT), or carbon nanofiber (CNF); a metal such as nickel, aluminum, or SUS, and combinations thereof.

<Solid Electrolyte Layer>

In the solid electrolyte layer, the electrolyte examples described above regarding the positive electrode active material layer can be used. The thickness of the solid electrolyte layer is, for example, 0.1 µm to 300 µm and, in particular, may be 0.1 µm to 100 µm.

<Negative Electrode Active Material Layer>

The negative electrode active material layer contains a negative electrode active material and optionally further contains a conductive additive, a binder, and a solid electrolyte.

As the negative electrode active material, alloy negative electrode active material particles are used. Here, in this embodiment, the alloy negative electrode active material refers to a metal negative electrode active material which reacts with lithium in a cell reaction to form an amorphous alloy. The alloy negative electrode active material particles are not particularly limited, and examples thereof include, but are not limited to, silicon particles, tin particles, germanium particles, aluminum particles, and combinations thereof. The primary particle size (median size) of the alloy negative electrode active material particles is preferably 10 µm or less, 7 µm or less, 5 µm or less, or 3 µm or less. Here, the primary particle size (median size) of the alloy negative electrode active material particles is measured using a laser diffraction scattering particle size distribution analyzer LA-920 (manufactured by Horiba, Ltd.).

A part of the alloy negative electrode active material particles included in the all-solid-state battery, which is used in the all-solid-state battery system according to this embodiment, are amorphized. The alloy negative electrode active material particles can be amorphized, for example, by initial charging and discharging which is performed after the construction of the all-solid-state battery.

The amorphization degree of the alloy negative electrode active material particles is 27.8% to 82.8%. This amorphization degree may be 30% or higher, 35% or higher, 40% or higher, or 50% or higher and may be 80% or lower, 75% or lower, 70% or lower, 65% or lower, 60% or lower, or 55% or lower. Here, the amorphization degree refers to a ratio of the mass of the amorphous portion to the total mass of the alloy negative electrode active material particles.

The amorphization degree can be calculated as follows. For example, the all-solid-state battery is charged by applying a predetermined voltage thereto, and then is discharged to 2.5 V. Next, in the negative electrode active material layer, a TEM image is obtained at a position at a distance of 5 µm to 15 µm from the solid electrolyte layer. Regarding at least four or more alloy negative electrode active material particles present in a 10 µm×10 µm visual field of the TEM image (including a part of the alloy negative electrode active material particles; it is not necessary that all the alloy negative electrode active material particles are included), a ratio of the area of the amorphous portion of the alloy negative electrode active material particles to the total area of the alloy negative electrode active material particles obtained from the BF images is obtained and can be set as the amorphization degree.

As the conductive additive, the binder, and the solid electrolyte, the examples described above regarding the positive electrode active material layer can be used.

<Control Device>

The control device which is used in the all-solid-state battery system according to this embodiment controls a charge-discharge voltage during use of the all-solid-state battery. The control device is not particularly limited as long as it can control the charge-discharge voltage. For example, the control device has a function of determining whether or not the voltage of the all-solid-state battery reaches a predetermined value during the discharging of the all-solid-state battery and, in a case where the voltage of the all-solid-state battery reaches the predetermined value, stopping the discharging; and a function of determining whether or not the voltage of the all-solid-state battery reaches a predetermined value during the charging of the all-solid-state battery and, in a case where the voltage of the all-solid-state battery reaches the predetermined value, stopping the charging.

It is preferable that the control device controls the voltage to be in a range of 2.50 V to 4.40 V during the use of the all-solid-state battery. The reason for this is as follows. In a case where the battery is discharged to a voltage lower than 2.50 V or is charged to a voltage higher than 4.40 V, the positive electrode active material or the negative electrode active material deteriorates, and the battery performance deteriorates. The range of the controlled discharge voltage may be 2.60 V or higher, 2.70 V or higher, 2.90 V or higher, 3.00 V or higher, 3.10 V or higher, or 3.20 V or higher and may be 4.30 V or lower, 4.20 V or lower, 4.10 V or lower, 4.00 V or lower, 3.90 V or lower, 3.80 V or lower, 3.70 V or lower, 3.60 V or lower, 3.50 V or lower, 3.40 V or lower, or 3.30 V or lower.

Figure 2:
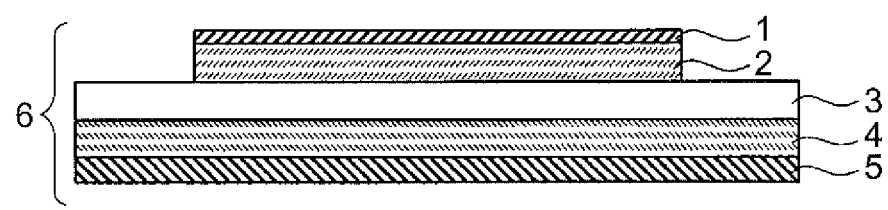
FIG. 2 is a diagram showing an example of an all-solid-state battery which is used in the all-solid-state battery system of FIG. 1.

Configuration Example of all-Solid-State Battery Used in all-Solid-State Battery System According to an Embodiment In a specific configuration example of the all-solid-state battery 6 which is used in the all-solid-state battery system according to this embodiment, the all-solid-state battery 6 includes a positive electrode current collector 1, a positive electrode active material layer 2, a solid electrolyte layer 3, a negative electrode active material layer 4, and a negative electrode current collector 5 in this order, as shown in FIG. 2.

Figure 3:
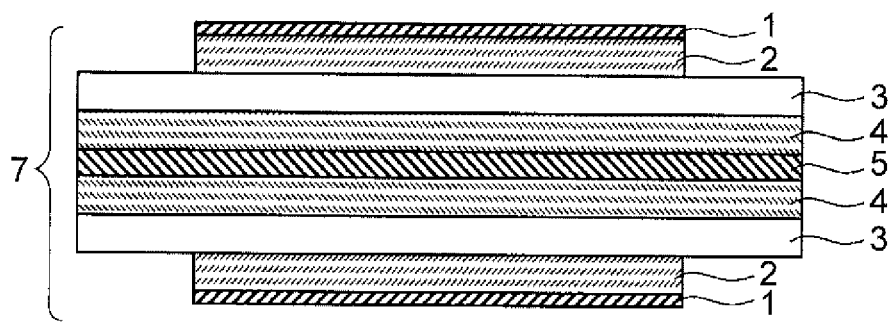
FIG. 3 is a diagram showing an example of the all-solid-state battery which is used in the all-solid-state battery system of FIG. 1.

As shown in FIG. 3, the all-solid-state battery which is used in the all-solid-state battery system according to this embodiment has a configuration in which the negative electrode active material layer, the solid electrolyte layer, the positive electrode active material layer, and the positive electrode current collector are provided on opposite sides of the negative electrode current collector.

Figure 4:
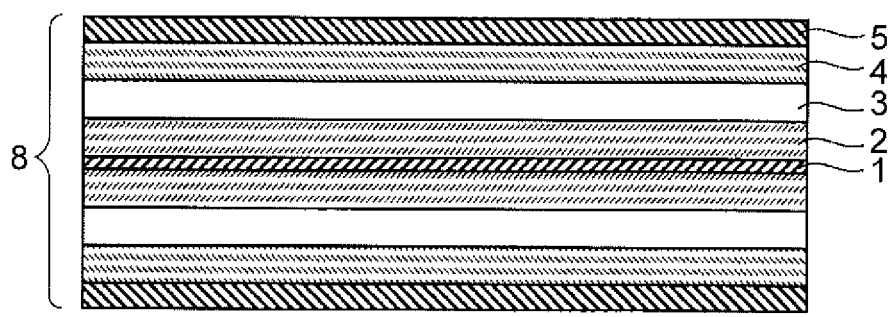
FIG. 4 is a diagram showing an example of the all-solid-state battery which is used in the all-solid-state battery system of FIG. 1.

As shown in FIG. 4, the all-solid-state battery which is used in the all-solid-state battery system according to this embodiment has a configuration in which the positive electrode active material layer, the solid electrolyte layer, the negative electrode active material layer, and the negative electrode current collector are provided on opposite sides of the positive electrode current collector.

FIGS. 2 to 4 are not intended to limit the configuration of the all-solid-state battery used in the all-solid-state battery system according to this embodiment.

Method of Manufacturing all-Solid-State Battery System According to an Embodiment A method of manufacturing the all-solid-state battery system according to another embodiment includes: a lamination step of laminating the positive electrode active material layer, the solid electrolyte layer, and the negative electrode active material layer containing alloy negative electrode active material particles as a negative electrode active material; and an initial charging step of charging the all-solid-state battery to a charge voltage, which is higher than the charge-discharge voltage during the use of the battery, after the lamination step.

It is presumed that the principle of the disclosed embodiments is as follows, although the disclosed embodiments are not limited to this principle.

Due to the charging, a part of the alloy negative electrode active material particles react with lithium to form an alloy. The alloy portion maintains the amorphous structure even after lithium ions are discharged due to the discharging.

By performing the initial charging at a voltage which is higher than a voltage range where the battery is used as a product, a larger amount of lithium ions than that in a case where the battery is used as a product move to the negative electrode side so as to react with the alloy negative electrode active material particles. As a result, the area of the amorphous portion in the alloy negative electrode active material particles can be increased to be more than the lithium ion release capacity of the positive electrode active material during normal use, and the lithium ion storage capacity of the negative electrode can be increased.

Further, it was found that, in order to make a large amount of lithium ions react with the alloy negative electrode active material particles during the initial charging, the positive electrode active material covered with a protective coating, which is a lithium-containing metal oxide such as lithium niobate, can be used.

The lithium-containing metal oxide used as the protective coating releases lithium ions at a voltage which is higher than a voltage range where the battery is normally used. Therefore, by charging the battery at a voltage which is higher than a voltage range where the battery is normally used, a larger amount of lithium ions than that which can be released from the positive electrode active material can be released to the negative electrode side. As a result, a large amount of the alloy negative electrode active material particles react with lithium ions, and the amorphization degree of the alloy negative electrode active material particles can be increased.

In a case where the battery is charged and discharged at a voltage which is higher than a voltage range where the battery is normally used, the positive electrode active material deteriorates, and the capability of the positive electrode active material to store and release lithium ions deteriorates. However, since the amorphization degree of the alloy negative electrode active material particles can be increased, the cycle characteristics of the battery as a whole are improved.

<Lamination Step>

In the lamination step, the positive electrode active material layer, the solid electrolyte layer, and the negative electrode active material layer containing alloy negative electrode active material particles as a negative electrode active material are laminated. The positive electrode active material layer, the solid electrolyte layer, the negative electrode active material layer, and the alloy negative electrode active material particles, which are used in the lamination step, may be the same as those used in the all-solid-state battery according to this embodiment. A part or all of the particles of the positive electrode active material included in the positive electrode active material layer may be covered with a protective coating which is a lithium-containing metal oxide containing lithium as a component. The lithium-containing metal oxide is not particularly limited, and examples thereof include lithium niobate.

<Initial Charging Step>

In the initial charging step, lithium ions released from the positive electrode active material can be made to react with the alloy negative electrode active material particles, thereby accelerating the amorphization of the alloy negative electrode active material.

The initial charge voltage in the initial charging step is higher than the charge-discharge voltage which is controlled in the all-solid-state battery system. For example, in order to manufacture the all-solid-state battery system in which the charge-discharge voltage will be controlled to be in a range of 2.50 V to 4.40 V, a value higher than 4.45 V and 5.00 V or lower can be selected as the initial charge voltage.

It is preferable that the battery is charged to satisfy the following conditions.

(Change Ratio (dQ/dV) of Charge Amount (Q) to Charge Voltage (V))/(Average Change Ratio (dQ/dV) of Charge Amount (Q) to Charge Voltage (V) of 4.00 V to 4.40 V)>1.3

The value of "(Change Ratio (dQ/dV) of Charge Amount (Q) to Charge Voltage (V))/(Average Change Ratio (dQ/dV) of Charge Amount (Q) to Charge Voltage (V) of 4.00 V to 4.40 V)" may be 1.4 or more, 1.5 or more, 1.6 or more, 1.7 or more, 1.8 or more, 1.9 or more, 2.0 or more, 2.1 or more.

Figure 5:
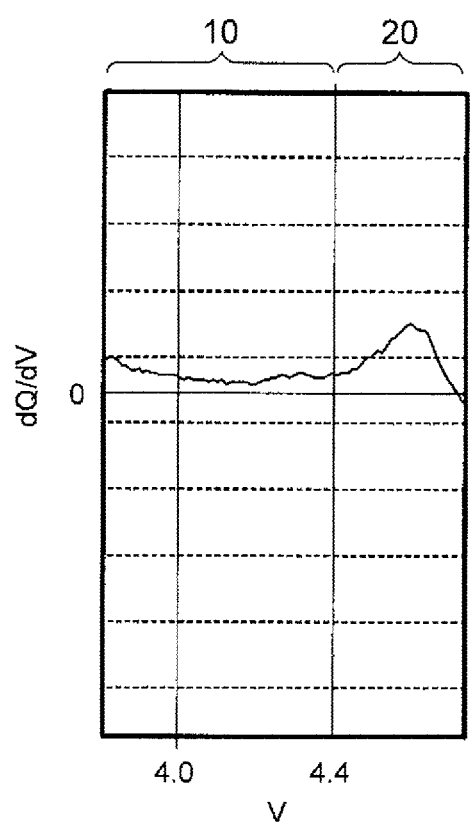
FIG. 5 is a diagram showing the principle of a manufacturing method according to an embodiment.
Figure 6:
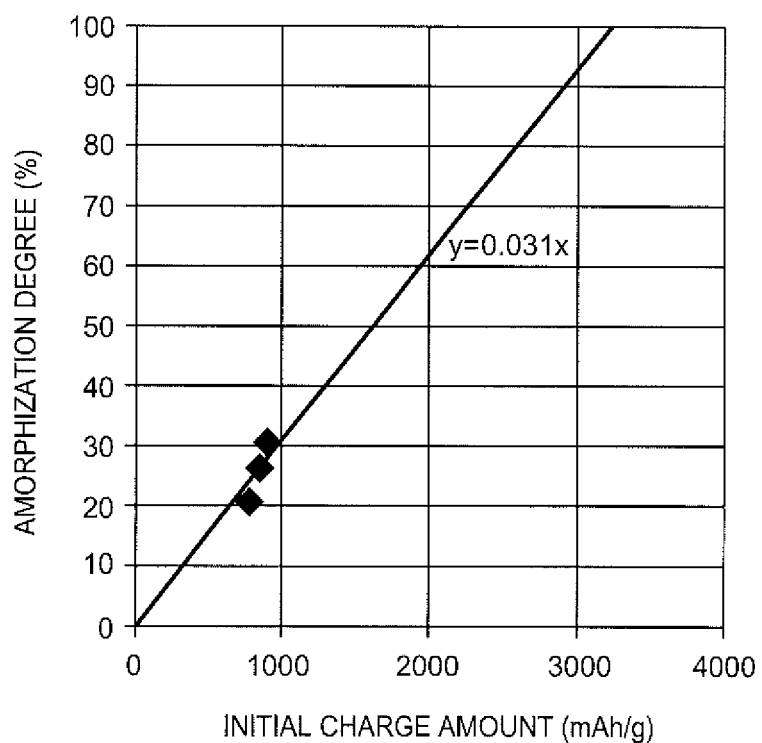
FIG. 6 is a graph showing a relationship between an amorphization degree and an initial charge amount.

With reference to FIG. 5, the above-described expression will be described. In a case where the all-solid-state battery is charged to a range of the charge-discharge voltage which is controlled by the control device, lithium ions are released mainly from the positive electrode active material, and the charge amount (Q) increases along with an increase in the voltage (V) (a range 10 in FIG. 5). As the charge voltage of the all-solid-state battery further increases, at a constant voltage, lithium ions are released from the protective coating which is the lithium-containing metal oxide. Therefore, the total amount of lithium ions moving from the positive electrode side to the negative electrode side increases, and the change ratio (dQ/dV) of the charge amount (Q) to the voltage (V) increases (a range 20 in FIG. 5).

In order to further improve the cycle characteristics of the all-solid-state battery, a method of replacing the positive electrode active material layer after the initial charging step can be adopted. For example, this method may include: removing, after the initial charging step, the positive electrode active material layer, or the positive electrode active material layer and the solid electrolyte layer from a laminate including the positive electrode active material layer, the solid electrolyte layer, and the negative electrode active material layer containing alloy negative electrode active material particles as a negative electrode active material; and providing a positive electrode active material layer, which is newly manufactured, or a positive electrode active material layer and a solid electrolyte layer, which are newly manufactured, on the negative electrode active material layer containing alloy negative electrode active material particles as a negative electrode.

By adding this step, the positive electrode active material layer which deteriorates after the initial charging step is replaced with a new positive electrode active material layer, and the battery performance can be further improved. Assuming that the positive electrode active material layer is replaced, the battery can be charged and discharged at a high voltage without considering the deterioration of the positive electrode active material layer in the initial charging step.

In a case where the method of replacing the positive electrode active material layer after the initial charging step is performed, it is preferable that the lithium content which can be released from the positive electrode active material layer before the replacement is higher than the lithium content which can be released from the positive electrode active material layer after the replacement.

In a case where the lithium ion content which can be released from the positive electrode active material layer before the replacement is higher than the lithium content which can be released from the positive electrode active material layer after the replacement, the voltage in the initial charging step is not necessarily higher than the range of the charge-discharge voltage which is controlled by the control device. The reason for this is as follows. Assuming that the charge voltage is constant, as the lithium content which can be released from the positive electrode active material layer increases, the amount of lithium ions released from the positive electrode active material layer increases.

By adopting the above-described configuration, in the initial charging step, a larger amount of lithium ions than that which can be released from the positive electrode active material layer after the replacement can be supplied to the negative electrode active material layer. Therefore, the amorphization degree of the alloy negative electrode active material particles can be further increased.

Examples 1 to 3 and Comparative Examples 1 to 5

As described below, all-solid-state batteries according to Examples 1 to 3 and Comparative Examples 1 to 5 were prepared, and the battery performance thereof was evaluated.

Example 1

As described below, the all-solid-state battery according to Example 1 was prepared, and the battery performance thereof was evaluated.

1. Preparation of all-Solid-State Battery (1) Preparation of Positive Electrode Active Material Layer a butyl butyrate solution in which 5 wt % of butyl butyrate as a dispersion medium and polyvinylidene fluoride as a binder were dissolved; $LiNi_{1/3}Co_{1/3}Mn_{1/3}O_2$ as a positive electrode active material which was coated with lithium niobate as a protective coating; a $Li_2S$—$P_2S_5$ glass ceramic as a solid electrolyte; and a vapor-grown carbon fiber (VGCF) as a conductive additive were put into a polypropylene case, and the components were stirred using an ultrasonic disperser (product name: UH-50, manufactured by SMT Corporation) for 30 seconds. Next, the polypropylene case was shaken using a shaker (product name: TTM-1, manufactured by Sibata Scientific Technology Ltd.) for 3 minutes and was further stirred using an ultrasonic disperser for 30 seconds. As a result, a paste for forming a positive electrode active material layer was prepared.

The paste for forming a positive electrode active material layer was applied to an aluminum foil as a positive electrode current collector using an applicator according to a doctor blade method, and then was dried on a hot plate heated to 100° C. for 30 minutes. As a result, a positive electrode active material layer was prepared.

(2) Preparation of Negative Electrode Active Material Layer

A butyl butyrate solution in which 5 wt % of butyl butyrate as a dispersion medium and polyvinylidene fluoride as a binder were dissolved; silicon particles (manufactured by Kojundo Chemical Laboratory Co., Ltd.) as a negative electrode active material; a $Li_2S$—$P_2S_5$ glass ceramic as a solid electrolyte; and a vapor-grown carbon fiber (VGCF) as a conductive additive were put into a polypropylene case, and the components were stirred using an ultrasonic disperser for 30 seconds. Next, the polypropylene case was shaken using a shaker for 30 minutes. As a result, a paste for forming a negative electrode active material layer was prepared.

The paste for a negative electrode active material layer was applied to a copper foil as a negative electrode current collector using an applicator according to a doctor blade method, and then was dried on a hot plate heated to 100° C. for 30 minutes. As a result, a negative electrode active material layer was prepared.

(3) Preparation of Solid Electrolyte Layer

A heptane solution in which 5 wt % of heptane as a dispersion medium and butadiene rubber as a binder were dissolved; and a $Li_2S$—$P_2S_5$ glass ceramic containing lithium iodide as a solid electrolyte were put into a polypropylene case, and the components were stirred using an ultrasonic disperser for 30 seconds. Next, the polypropylene case was shaken using a shaker for 30 minutes. As a result, a paste for a solid electrolyte layer was prepared.

The paste for a solid electrolyte layer was applied to an aluminum foil as a substrate using an applicator according to a blade method, and then was dried on a hot plate heated to 100° C. for 30 minutes. As a result, a solid electrolyte layer was prepared.

(4) Lamination and Pressing Step

The solid electrolyte layer was laminated on the positive electrode active material layer such that the solid electrolyte layer was in contact with the positive electrode active material layer, and then the laminate was pressed at 1 ton/cm². The aluminum foil as the substrate of the solid electrolyte layer was removed. As a result, a laminate including the solid electrolyte layer and the positive electrode active material layer was prepared.

Next, the negative electrode active material layer was laminated on the solid electrolyte layer side of the laminate and then was pressed at 6 ton/cm². As a result, a battery was completed. The prepared cell was restrained by a restraining jig at a restraining pressure of 2 N·m and was put into a desiccator for the evaluation.

2. Battery Performance Evaluation

The prepared all-solid-state battery according to Example 1 was initially charged to 4.55 V at 10 hour rate (1/10 C) by constant current-constant voltage charging (end current: 1/100 C), and then was initially discharged to 2.50 V by constant current-constant voltage discharging. Next, the battery was charged to 4.40 V by constant current-constant voltage charging (end current: 1/100 C), and then was initially discharged to 2.50 V by constant current-constant voltage discharging. As a result, the discharge capacity of the all-solid-state battery according to Example 1 before a durability test was measured.

Next, in the durability test, the battery was charged to 4.17 V at 0.5 hour rate (2 C) and then was discharged to 3.17 V. This cycle was repeated 300 times. After the durability test, the battery was charged to 4.40 V by constant current-constant voltage charging (end current: 1/100 C), and then was initially discharged to 2.50 V by constant current-constant voltage discharging. As a result, the discharge capacity of the all-solid-state battery according to Example 1 after the durability test was measured.

The discharge capacity after the durability test was divided by the discharge capacity before the durability test to calculate a capacity retention of the all-solid-state battery according to Example 1.

Examples 2 and 3 and Comparative Examples 1 to 3

Using the same method as in Example 1, all-solid-state batteries according to Examples 2 and 3 and Comparative Examples 1 to 3 were prepared. Next, the battery performance of the all-solid-state batteries according to Examples 2 and 3 and Comparative Examples 1 to 3 was evaluated using the same method as in Example 1, except that the initial charge voltage of Example 2 was changed to 4.70 V, the initial charge voltage of Example 3 was changed to 5.00 V, the initial charge voltage of Comparative Example 1 was changed to 4.45 V, the initial charge voltage of Comparative Example 2 was changed to 4.40 V, and the initial charge voltage of Comparative Example 3 was changed to 3.60 V.

Comparative Examples 4 and 5

All-solid-state batteries according to Comparative Examples 4 and 5 were prepared using the same method as in Example 1, except that the thicknesses of the negative electrode active material layers according to Comparative Examples 4 and 5, which were prepared using a doctor blade method, were about 2 times and about 0.5 times the thickness of the negative electrode active material layer according to Example 1, respectively. Next, the battery performance of the all-solid-state batteries according to Comparative Examples 4 and 5 was evaluated using the same method as in Example 1, except that the initial charge voltage was changed to 4.45 V.

<Measurement Results>

Regarding the all-solid-state batteries according to Examples 1 to 3 and Comparative Examples 1 to 5, the manufacturing conditions, the battery configuration, and the measurement results are shown in Table 1 below.

"Amorphous Capacity (W)" represents the capacity of the amorphous portion in the silicon particles. "Amorphous Capacity (W)" was calculated from "Amorphous Capacity (W)"=("Si Weight" (mg)×1000)×"Amorphization Degree" (%)×4200 (mAh/g) (theoretical capacity of the silicon particles).

"Controlled Discharge Capacity (Z)" represents the discharge capacity before the durability test in an actual voltage range controlled by the control device in the all-solid-state battery system which was completed as a product.

"Z/W" represents the value obtained by dividing "Controlled Discharge Capacity (Z)" by "Amorphous Capacity (W)".

"Capacity Retention" represents the value which was calculated when the result of the all-solid-state battery according to Comparative Example 1 in the durability test was expressed by 100%.

2. Discussion

In the all-solid-state batteries according to Examples 1 to 3, the values of "Amorphization Degree" were 27.8%, 34.1%, and 362%, respectively, and the values of "Z/W" were 0.53, 0.54, and 0.52, respectively. Accordingly, the all-solid-state batteries according to Examples 1 to 3 satisfy the following conditions: the amorphization degree is 27.8% to 82.8%; and 0.32≤Z/W≤0.60.

In the all-solid-state batteries according to Examples 1 to 3, the values of "Capacity Retention" were 108%, 104%, and 109%.

In the all-solid-state batteries according to Comparative Examples 1 to 4, the values of "Amorphization Degree" were 26.6%, 23.9%, 5.8%, and 13.3% respectively, and the values of "Z/W" were 0.66, 0.68, 2.85, and 0.64, respectively. Accordingly, the all-solid-state batteries according to Comparative Examples 1 to 4 do not satisfy the following conditions: the amorphization degree is 27.8% to 82.8%; and 0.32≤Z/W≤0.60.

TABLE 1

|  | Manufacturing Conditions | | | Battery Configuration | | | | Measurement Result |
|---|---|---|---|---|---|---|---|---|
|  | Si Weight (mg) | Initial Charge Voltage (V) | Initial Charge Amount (mAh/g) | Amorphization Degree (%) | Amorphous Capacity (W) (mAh) | Controlled Discharge Capacity (Z) (mAh) | Z/W | Capacity Retention (%) |
| Example 1 | 2.66 | 4.55 | 896 | (27.8) | 3.40 | 1.81 | 0.53 | 108 |
| Example 2 | 2.50 | 4.70 | 1099 | (34.1) | 3.58 | 1.92 | 0.54 | 104 |
| Example 3 | 2.39 | 5.00 | 1168 | (36.2) | 3.64 | 1.90 | 0.52 | 109 |
| Comparative Example 1 | 2.55 | 4.45 | 858 | (26.6) | 2.84 | 1.87 | 0.66 | 100 |
| Comparative Example 2 | 2.55 | 4.40 | 770 | (23.9) | 2.56 | 1.75 | 0.68 | 99 |
| Comparative Example 3 | 2.66 | 3.60 | 187 | (5.8) | 0.65 | 1.85 | 2.85 | 96 |
| Comparative Example 4 | 4.84 | 4.45 | 428 | (13.3) | 2.70 | 1.72 | 0.64 | 97 |
| Comparative Example 5 | 1.44 | 4.45 | 1417 | (43.9) | 2.65 | 1.77 | 0.67 | 97 |

1. Description of Table 1

In Table 1, "Si Weight" represents the weight of the silicon particles contained in the all-solid-state battery as the negative electrode active material.

"Amorphization degree" represents the ratio of the amorphous portion to all of the silicon particles. For the sake of convenience, "amorphization degree" was calculated from 0.031×"Initial Charge Amount" (refer to "<<Relationship between Initial Charge Capacity and Amorphization Degree>>" below).

In the all-solid-state batteries according to Comparative Examples 1 to 4, the values of "Capacity Retention" were 100%, 99%, 96%, and 97%. In the all-solid-state batteries according to Comparative Examples 2 to 4, the values of "Capacity Retention" were lower than those of the all-solid-state batteries according to Examples 1 to 3.

In the all-solid-state battery according to Comparative Example 5, the value of "Amorphization Degree" was 43.9%, and the value of "Z/W" was 0.67. Accordingly, the all-solid-state battery according to Comparative Example 5 satisfies that the amorphization degree is 27.8% to 82.8%, but does not satisfy that 0.32≤Z/W≤0.60.

In the all-solid-state battery according to Comparative Example 5, the value of "Capacity Retention" was 97%, which was lower than those of the all-solid-state batteries according to Examples 1 to 3.

It can be said from the above results that, in the all-solid-state batteries having a configuration which satisfies the amorphization degree of 27.8% to 82.8% and 0.32≤Z/W≤0.60, the values of "Capacity Retention" are higher than those in the all-solid-state batteries which do not satisfy the amorphization degree of 27.8% to 82.8% and 0.32≤Z/W≤0.60.

This implies that, in the all-solid-state batteries according to Examples 1 to 3, the values of "Z/W" were less than that of Comparative Example 1; therefore, the ratio of expansion and shrinkage of the amorphous portion to all of the silicon particles was lower than that of Comparative Example 1, and the crushing of the silicon particles caused by repeated charging and discharging was not likely to occur.

On the other hand, in the all-solid-state batteries according to Comparative Examples 1 to 5, the area of the amorphous portion in the silicon particles was not sufficiently large. Therefore, the area of a portion which reacted with lithium ions to expand and shrink increased, the silicon particles were crushed by stress generated during 300 cycles of charging and discharging, and thus the values of "Capacity Retention" decreased. In particular, in Comparative Example 3, the value "Z/W" was the largest among the values of Examples 1 to 3 and Comparative Examples 1 to 5, whereas the value of "Capacity Retention" was 96% and was the lowest among the values of Examples 1 to 3 and Comparative Examples 1 to 5. This shows that, in Comparative Example 3, the ratio of expansion and shrinkage of the amorphous portion to all of the silicon particles caused by charging and discharging was high, and a larger amount of the silicon particles than that of the other Examples and Comparative Examples were crushed.

It can be said from the above results that, by charging the all-solid-state battery at a higher initial charge voltage, the cycle characteristics of the all-solid-state battery can be improved.

Examples 4 to 7 and Comparative Examples 6 and 7

As described below, all-solid-state batteries according to Examples 4 to 7 and Comparative Examples 6 and 7 were prepared, and the battery performance thereof was evaluated.

<Preparation of all-Solid-State Battery and Evaluation Method of Battery Performance>

Using the same method as in Example 1, all-solid-state batteries according to Examples 4 to 7 and Comparative Examples 6 and 7 were prepared. Next, the battery performance of the all-solid-state battery according to Example 4 was evaluated using the same method as in Example 1. Next, the battery performance of the all-solid-state batteries according to Examples 5 to 7 and Comparative Examples 6 and 7 was evaluated using the same method as in Example 1, except that the initial charge voltage of Example 5 was changed to 4.60 V, the initial charge voltage of Example 6 was changed to 4.65 V, the initial charge voltage of Example 7 was changed to 4.70 V, the initial charge voltage of Comparative Example 6 was changed to 4.40 V, and the initial charge voltage of Comparative Example 7 was changed to 4.45 V.

<Measurement Results>

Regarding the all-solid-state batteries according to Examples 4 to 7 and Comparative Examples 6 and 7, the manufacturing conditions, the battery configuration, and the measurement results are shown in Table 2 below.

TABLE 2

| | Manufacturing Conditions | | | Battery Configuration | | Controlled | | Measurement Result | |
|---|---|---|---|---|---|---|---|---|---|
| | Initial Charge Voltage (V) | β/α (—) | Initial Charge Amount | Amorphization Degree (%) | Amorphous Capacity (W) (mAh) | Discharge Capacity (Z) (mAh) | Z/W | Capacity Retention (%) | Resistance (%) |
| Comparative Example 6 | 4.40 | 1.10 | 770 | (23.8) | 2.56 | 1.88 | 0.73 | 96 | 101 |
| Comparative Example 7 | 4.45 | 1.27 | 858 | (26.6) | 2.84 | 1.89 | 0.67 | 100 | 100 |
| Example 4 | 4.55 | 1.91 | 896 | (27.8) | 3.40 | 1.94 | 0.57 | 108 | 94 |
| Example 5 | 4.60 | 2.18 | 1035 | (32.0) | 3.37 | 1.91 | 0.57 | 108 | 93 |
| Example 6 | 4.65 | 1.65 | 1136 | (35.2) | 3.62 | 1.97 | 0.54 | 106 | 96 |
| Example 7 | 4.70 | 0.69 | 1099 | (34.1) | 3.58 | 1.94 | 0.54 | 106 | 99 |

1. Description of Table 2

In Table 2, "β" represents a change ratio (dQ/dV) of a capacity (Q) to an upper limit charge voltage (V) in the initial charging step, and "α" represents an average change ratio (dQ/dV) of a capacity (Q) to a charge voltage (V) of 4.0 V to 4.4 V.

In Table 2, the values of "Amorphization Degree" were calculated using the same method as in "Amorphization Degree" of Table 1.

Accordingly, "β/α" represents the value which was calculated from (Change Ratio (dQ/dV) of Capacity (Q) to Upper Limit Charge Voltage (V) in Initial Charging Step)/(Average Change Ratio (dQ/dV) of Capacity (Q) to Charge Voltage (V) of 4.0 V to 4.4 V).

In Table 2, "Amorphous Capacity" represents the capacity of the amorphous portion in the silicon particles.

In Table 2, "Capacity Retention" represents the value which was calculated when the result of the all-solid-state battery according to Comparative Example 7 in the durability test was expressed by 100%. "Resistance" represents the internal resistance of the all-solid-state battery which was calculated when the internal resistance of the all-solid-state battery according to Comparative Example 7 was expressed by 100%.

2. Discussion

In the methods according to Examples 4 to 6, all-solid-state batteries were prepared in which the values of β/α were 1.91, 2.18, and 1.65, respectively. Accordingly, the methods according to Examples 4 to 6 satisfy β/α>1.3.

In the all-solid-state batteries manufactured using the methods according to Examples 4 to 6, the values of "Amorphous Capacity" were 3.40 mAh, 3.37 mAh, and 3.62 mAh, respectively, which were higher than those of the all-solid-state batteries manufactured using the methods according to Comparative Examples 6 and 7. In the all-solid-state batteries manufactured using the methods according to Examples 4 to 6, the values of "Capacity Retention" were 108%, 108%, and 106%, respectively, which were higher than that of Comparative Example 6, The values of "Resistance" were 94%, 93%, and 96%, respectively, which were lower than that of Comparative Example 6.

This implies that, by initially charging the battery such that the value of β/α is higher than 1.3, an all-solid-state battery having a high amorphous capacity can be manufactured, and "Capacity Retention" and "Resistance" of the manufactured all-solid-state battery can be improved.

On the other hand, in the methods according to Comparative Example 6 and 7, all-solid-state batteries were prepared in which the values of β/α were 1.10 and 1.27, respectively. Accordingly, the methods according to Comparative Examples 6 to 7 do not satisfy β/α>1.3.

In the all-solid-state batteries according to Comparative Examples 6 and 7, the values of "Capacity Retention" were 96% and 100%. The values of "Resistance" were 101% and 100%, respectively.

In the method according to Example 7, an all-solid-state battery was prepared in which the value of β/α was 0.69.

In the all-solid-state battery according to Example 7, the value of "Capacity Retention" was 106%. The value of "Resistance" was 99%.

In the method according to Example 7, the initial charge was changed to 4.70 V, and the value of β/α was lower than 1.3 although the initial charge voltage was higher than those of Examples 4 to 6. The reason for this is presumed to be as follows. As the charge voltage increased, lithium ions were released from lithium niobate. However, before the charge voltage reached 4.70 V, most of the releasable lithium ions were released from lithium niobate, and the amount of lithium ions moving from the positive electrode side to the negative electrode side decreased.

In the all-solid-state battery according to Example 7, the value of "Capacity Retention" was higher than that of Comparative Example 6, and the value of "Resistance" was lower than that of Comparative Example 6. On the other hand, in the all-solid-state battery according to Example 7, the value of "Resistance" was higher than those of Examples 4 to 6. The reason for this is presumed to be that, for example, the deterioration of lithium niobate as the protective coating was severe. Therefore, it is not preferable that the initial charge voltage is increased unconditionally, and by controlling the initial charging and discharging such that the value of β/α is higher than 1.3, the value of "Capacity Retention" can be increased, and the value of "Resistance" can be reduced.

It can be said from the above results that, by controlling the initial charging and discharging such that the value of β/α is higher than 1.3, the cycle characteristics of the all-solid-state battery can be improved.

Reference Examples 1 to 6

In order to describe a relationship between the value of β/α and the protective coating of the positive electrode active material formed of a lithium-containing metal oxide, all-solid-state batteries according to Reference Examples 1 to 6 were prepared as described below, and the battery performance thereof was evaluated.

1. Reference Examples 1 to 3

All-solid-state batteries according to Reference Examples 1 to 3 were prepared using the same method as in Example 4, except that the negative electrode active material was changed to natural graphite-based carbon.

The all-solid-state batteries according to Reference Examples 1 to 3 were initially charged using the same method as in Example 4, except that the initial charge voltage of Reference Example 1 was changed to 4.45 V, the initial charge voltage of Reference Example 2 was changed to 4.55 V, and the initial charge voltage of Reference Example 3 was changed to 4.70 V. Then, the values of β/α were measured.

2. Reference Examples 4 to 6

All-solid-state batteries according to Reference Examples 4 to 6 were prepared using the same method as in Example 4, except that: the positive electrode active material was changed to $LiNi_{1/3}Co_{1/3}Mn_{1/3}O_2$ which was not coated with lithium niobate; and the negative electrode active material was changed to natural graphite-based carbon.

The all-solid-state batteries according to Reference Examples 4 to 6 were initially charged using the same method as in Example 4, except that the initial charge voltage of Reference Example 4 was changed to 4.45 V, the initial charge voltage of Reference Example 5 was changed to 4.55 V, and the initial charge voltage of Reference Example 6 was changed to 4.70 V. Then, the values of β/α were measured.

3. Measurement Results

Regarding the all-solid-state batteries according to Reference Examples 1 to 6, the experiment conditions and the measurement results are shown in Table 3 below.

TABLE 3

| | Experiment Conditions | | Measurement Result |
|---|---|---|---|
| | $LiNbO_3$ | Initial Charge Voltage (V) | β/α (—) |
| Reference Example 1 | Present | 4.45 | 1.19 |
| Reference Example 2 | | 4.55 | 1.77 |
| Reference Example 3 | | 4.70 | 1.52 |
| Reference Example 4 | None | 4.45 | 0.93 |
| Reference Example 5 | | 4.55 | 0.90 |
| Reference Example 6 | | 4.70 | 0.53 |

1. Description of Table 3

In Table 3, "β/α" has the same meaning as in the description of Table 2.

2. Discussion

As shown in Table 3, in Reference Examples 1 to 3, the values of β/α were 1.19, 1.77, and 1.52, which were higher than 1. On the other hand, in Reference Examples 4 to 6, the values of β/α were 0.93, 0.90, and 0.53, which were lower than 1. This implies that, by the positive electrode active material layer containing lithium niobate, the value of β/α can be increased. That is, by the positive electrode active material layer containing lithium niobate, a large amount of lithium ions can be supplied to the negative electrode active material at a high voltage.

Examples 8 to 11

As described below, all-solid-state batteries according to Examples 8 to 11 were prepared, and the battery performance thereof was evaluated.

Example 8

1. Method of Manufacturing Virtual all-Solid-State Lithium Secondary Battery (1) Preparation of Positive Electrode Active Material Layer for Supplying Lithium A butyl butyrate solution in which 5 wt % of butyl butyrate as a dispersion medium and polyvinylidene fluoride as a binder were dissolved; $LiNi_{1/3}Co_{1/3}Mn_{1/3}O_2$ as a positive electrode active material; a $Li_2S$—$P_2S_5$ glass ceramic containing lithium iodide as a solid electrolyte; and a vapor-grown carbon fiber (VGCF) as a conductive additive were put into a polypropylene case, and the components were stirred using a ultrasonic disperser (product name: UH-50, manufactured by SMT Corporation) for 30 seconds. Next, the polypropylene case was shaken using a shaker (product name: TTM-1, manufactured by Sibata Scientific Technology Ltd.) for 3 minutes and was further stirred using an ultrasonic disperser for 30 seconds. As a result, a paste for a positive electrode active material layer was prepared.

The paste for a positive electrode active material layer was applied to an aluminum foil as a positive electrode current collector using an applicator according to a blade method, and then was dried on a hot plate heated to 100° C. for 30 minutes. As a result, a positive electrode active material layer for supplying lithium was formed on the positive electrode current collector.

(2) Preparation of Negative Electrode Active Material Layer

A butyl butyrate solution in which 5 wt % of butyl butyrate as a dispersion medium and polyvinylidene fluoride as a binder were dissolved; silicon particles (manufactured by Kojundo Chemical Laboratory Co., Ltd.) as a negative electrode active material; a $Li_2S$—$P_2S_5$ glass ceramic containing lithium iodide as a solid electrolyte; and a vapor-grown carbon fiber (VGCF) as a conductive additive were put into a polypropylene case, and the components were stirred using an ultrasonic disperser for 30 seconds. Next, the polypropylene case was shaken using a shaker for 30 minutes. As a result, a paste for a negative electrode active material layer was prepared.

The paste for a negative electrode active material layer was applied to a copper foil as a negative electrode current collector using an applicator according to a blade method, and then was dried on a hot plate heated to 100° C. for 30 minutes. As a result, a negative electrode active material layer was formed on the negative electrode current collector.

(3) Preparation of Solid Electrolyte Layer

A heptane solution in which 5 wt % of heptane as a dispersion medium and butadiene rubber as a binder were dissolved; and a $Li_2S$—$P_2S_5$ glass ceramic containing lithium iodide as a solid electrolyte were put into a polypropylene case, and the components were stirred using an ultrasonic disperser for 30 seconds. Next, the polypropylene case was shaken using a shaker for 30 minutes. As a result, a paste for a solid electrolyte layer was prepared.

The paste for a solid electrolyte layer was applied to an aluminum foil as a substrate using an applicator according to a doctor blade method, and then was dried on a hot plate heated to 100° C. for 30 minutes. As a result, a solid electrolyte layer was prepared. The positive electrode active material layer for supplying lithium and the inactive negative electrode active material layer containing no lithium were arranged on the solid electrolyte layer, and then the laminate was pressed at 6 ton/cm². The Al foil on the solid electrolyte layer side layer was removed. As a result, a laminate including the positive electrode active material layer for supplying lithium and the solid electrolyte layer, and a laminate including the inactive negative electrode active material layer containing no lithium and the solid electrolyte layer were prepared.

(4) Preparation of Virtual all-Solid-State Lithium Secondary Battery

The laminate including the positive electrode active material layer for supplying lithium and the solid electrolyte layer was punched using a punching tool having a diameter of 12.5 mm, and the laminate including the negative electrode active material layer and the solid electrolyte layer was punched using a punching tool having a diameter of 13.0 mm. The two laminates were laminated such that the solid electrolyte layers thereof were in contact with each other, and were restrained using a restraining jig at a restraining pressure of 2 N/m. As a result, a virtual all-solid-state lithium secondary battery was prepared.

2. Charging and Discharging of Virtual all-Solid-State Lithium Secondary Battery The virtual all-solid-state lithium secondary battery was put into a desiccator and was charged to 4.55 V at 0.05 C by constant current-constant voltage charging (end current: 0.01 C). Next, the battery was discharged to 2.50 V by constant current-constant voltage discharging. As a result, lithium was supplied to the negative electrode active material layer.

3. Disassembly and Reconstruction of Battery

Next, the restraining of the virtual all-solid-state lithium secondary battery was released, and the virtual all-solid-state lithium secondary battery was disassembled into the laminate including the positive electrode active material layer for supplying lithium and the solid electrolyte layer, and the laminate including the inactive negative electrode active material layer containing no lithium and the solid electrolyte layer. The laminate including the negative electrode active material layer and the solid electrolyte layer was set as a first laminate. A new laminate was prepared using the same method as the above-described method of manufacturing the laminate including the positive electrode active material layer and the solid electrolyte layer, except that the lithium content of the positive electrode active material layer for supplying lithium which was used in the virtual all-solid-state lithium secondary battery was 1.5 times the lithium content of the positive electrode active material layer of the newly prepared laminate. This new laminate was punched using a punching tool having a diameter of 12.5 mm and was set as a second laminate.

A solid electrolyte layer for joining, which was prepared using the following method, was laminated on the first laminate such that the solid electrolyte layer of the first laminate was in contact with the solid electrolyte layer for joining, and then and was pressed at 1.0 ton/cm². The aluminum foil as a substrate was removed. Next, the second laminate was laminated such that the solid electrolyte layer of the second laminate was in contact with the solid electrolyte layer for joining, and then and was pressed at 6 ton/cm². As a result, an all-solid-state lithium secondary battery according to Example 8 was prepared.

4. Preparation of Solid Electrolyte Layer for Joining

A heptane solution in which 5 wt % of heptane as a dispersion medium and butadiene rubber as a binder were dissolved; and a $Li_2S$—$P_2S_5$ glass ceramic containing lithium iodide as a solid electrolyte were put into a polypropylene case, and the components were stirred using an ultrasonic disperser for 30 seconds. Next, the polypropylene case was shaken using a shaker for 30 minutes. As a result, a paste for a solid electrolyte layer for joining was prepared.

The paste for a solid electrolyte layer for joining was applied to an aluminum foil as a substrate according to a doctor blade method, and then was dried on a hot plate heated to 100° C. for 30 minutes. As a result, a solid electrolyte layer for joining was formed on the substrate and was punched using a punching tool having a diameter of 13.0 mm.

5. Initial Charging and Discharging

The completed all-solid-state lithium secondary battery according to Example 8 was put into a desiccator and was charged to 4.55 V at 0.05 C by constant current-constant voltage charging (end current: 0.01 C). Next, the battery was discharged to 2.50 V by constant current-constant voltage discharging. At this time, the discharge capacity thereof was measured.

6. Measurement of Capacity Retention

After the completion of the initial charging and discharging, the all-solid-state lithium secondary battery according to Example 8 was charged to 4.40 V by constant current-constant voltage charging and then was discharged to 2.50 V by constant current-constant voltage discharging. At this time, the discharge capacity was measured (first discharge capacity). Next, the all-solid-state lithium secondary battery was charged to 4.17 V at 0.5 hour rate (2 C) and then was discharged to 3.17 V. This cycle was repeated 300 times. After 300 cycles, the all-solid-state lithium secondary battery according to Example 8 was charged to 4.40 V by constant current-constant voltage charging and then was discharged to 2.50 V by constant current-constant voltage discharging. At this time, the discharge capacity was measured (second discharge capacity). The capacity retention was calculated from "Second Discharge Capacity/First Discharge Capacity".

Examples 9 and 10

All-solid-state lithium secondary batteries according to Examples 9 and 10 were prepared using the same method as in Example 8, except that the lithium contents of the positive electrode active material layers used in the virtual all-solid-state lithium secondary batteries of Examples 9 and 10 were 1.50 times and 1.01 times the lithium content of the positive electrode active material layer of the newly prepared laminate, respectively.

The all-solid-state lithium secondary batteries according to Examples 9 and 10 were initially charged and discharged using the same method as in Example 8, and then the discharge capacity values thereof were measured. The capacity retention values of the all-solid-state lithium secondary batteries according to Examples 9 and 10 were calculated using the same method as in Example 8.

Example 11

An all-solid-state lithium secondary battery according to Example 11 was obtained using the same method as in Example 8, except that the solid electrolyte layer for joining, which was prepared using the same method as in Example 8, was inserted into the laminate including the positive electrode active material layer and the solid electrolyte layer and the laminate including the negative electrode active material layer and the solid electrolyte layer for the lamination. The all-solid-state lithium secondary battery according to Example 11 was initially charged and discharged using the same method as in Example 8, and then the discharge capacity value thereof was measured. The capacity retention of the all-solid-state lithium secondary batteries according to Example 11 were calculated using the same method as in Example 8.

<Measurement Results>

Table 4 shows the manufacturing conditions, the battery configuration, and the measurement results regarding the all-solid-state batteries according to Examples 8 to 11.

TABLE 4

| | Manufacturing Conditions | | | Battery Configuration | | Measurement Result | |
|---|---|---|---|---|---|---|---|
| | Disassembly and Reconstruction | A/B (—) | Initial Charge Amount (mAh) | Amorphization Degree (%) | Z/W | Resistance (%) | Capacity Retention (%) |
| Example 8 | Performed | 1.82 | 2671 | 82.8 | 0.32 | 93 | 138 |
| Example 9 | Performed | 1.50 | 2289 | 71.0 | 0.39 | 94 | 138 |
| Example 10 | Performed | 1.01 | 2106 | 65.3 | 0.61 | 96 | 132 |
| Example 11 | Not Performed | — | 2065 | 64.0 | 0.60 | 100 | 100 |

1. Description of Table 4

In Table 4, "Disassembly and Reconstruction" represents whether or not the step of disassembling the all-solid-state battery to replace the positive electrode active material layer ("3. Disassembly and Reconstruction of Battery" described above) was performed.

In Table 4, "A" represents the capacity of the positive electrode active material layer for supplying lithium and substantially indicates the lithium content which can be released from the positive electrode active material layer for supplying lithium. "B" represents the capacity of the positive electrode active material layer and substantially indicates the lithium content which can be released from the positive electrode active material layer. Accordingly, "A/B" represents the value obtained by dividing the capacity of the positive electrode active material layer for supplying lithium by the capacity of the positive electrode active material layer. In Example 11, "3. Disassembly and Reconstruction of Battery" described above was not performed, and thus a numerical value was not shown.

"Amorphization Degree" and "Z/W" have the same meanings as in the description of Table 1. In Table 4, for the sake of convenience, specific numerical values of "Z" and "W" are not shown.

"Capacity Retention" represents the value which was calculated when the result of the all-solid-state battery according to Example 11 in the durability test was expressed by 100%. "Resistance" represents the internal resistance of the all-solid-state battery which was calculated when the internal resistance of the all-solid-state battery according to Example 11 was expressed by 100%.

2. Discussion

In the all-solid-state lithium secondary battery according to Example 10, the value of "Resistance" was 96%, which was lower than that of Example 11. On the other hand, in the all-solid-state lithium secondary battery according to Example 10, the value of "Capacity Retention" was 132%, which was lower than that of Example 11.

In the all-solid-state lithium secondary battery according to Example 10, the ratio "A/B" of "A", representing the lithium content which can be released from the positive electrode active material layer for supplying lithium, to "B", representing which can be released from the positive electrode active material layer, was 1.01, and the resistance and the capacity retention were significantly improved to be higher than those of Example 11 although there was no significant difference in A/B. This implies that, by replacing the positive electrode active material layer, which deteriorates by the charging of the all-solid-state lithium secondary battery, with a new positive electrode active material layer, an all-solid-state lithium secondary battery having reduced resistance and improved capacity retention can be manufactured. It can be said from a comparison between Examples 8 to 10 that, as the value of "A/B" increases, the value of "Resistance" is reduced, and the value of "Capacity Retention" is improved.

It can be said from the above results that, by replacing the positive electrode active material layer, which deteriorates after the initial charging step, with a new positive electrode active material layer, and the cycle characteristics of the all-solid-state battery can be further improved.

<<Relationship Between Initial Amount of Charge and Amorphization Degree>>

The amorphization degree can be calculated as follows. The all-solid-state battery is charged by applying a predetermined voltage thereto, and then is discharged to 2.50 V. Next, in the negative electrode active material layer, a TEM image is obtained at a position at a distance of 5 μm to 15 μm from the solid electrolyte layer. Regarding at least four or more silicon particles present in a 10 μm×10 μm visual field of the TEM image (including a part of the silicon particles; it is not necessary that all the silicon particles are not included), a ratio of the area of the amorphous portion of the silicon particles to the total area of the silicon particles obtained from the BF images is obtained and can be set as the amorphization degree. A correlation between the value of the amorphization degree, which was obtained by the above-described calculation, and the value of the initial charge amount was investigated using the all-solid-state batteries according to Example 1 and Comparative Examples 1 and 2.

Table 5 shows a relationship between the initial charge amount and the amorphization degree regarding the all-solid-state batteries of Example 1 and Comparative Examples 1 and 2.

TABLE 5

|  | Initial Charge Amount (mAh/g) | Amorphization Degree (%) |
| --- | --- | --- |
| Example 1 | 896 | 30.4 |
| Comparative Example 1 | 858 | 26.5 |
| Comparative Example 2 | 770 | 21.0 |

It was found that, in Example 1 and Comparative Examples 1 and 2, as shown in FIG. 5, the value of "Initial Charge Amount" and the value of "Amorphization Degree" satisfy the relationship "Amorphization Degree (%)=0.031× Initial (%) Charge amount (mAh)".

It will be appreciated that the above-disclosed features and functions, or alternatives thereof, may be desirably combined into different compositions, systems or methods. Also, various alternatives, modifications, variations or improvements may be subsequently made by those skilled in the art. As such, various changes may be made without departing from the spirit and scope of this disclosure.

What is claimed is:

1. An all-solid-state battery system comprising:
an all-solid-state battery comprising a positive electrode active material layer, a solid electrolyte layer, and a negative electrode active material layer including alloy negative electrode active material particles having an amorphization degree in the range of 27.8% to 82.8%; and
a control device configured to control a charge-discharge voltage during use of the all-solid-state battery,
wherein a ratio Z/W is in the range of 0.32 to 0.60, where Z is a controlled discharge capacity of the all-solid-state battery, and W is a theoretical capacity of the alloy negative electrode active material particles×a total weight of the alloy negative electrode active material particles×the amorphization degree.

2. The all-solid-state battery system according to claim 1, wherein the alloy negative electrode active material particles are silicon particles.

3. The all-solid-state battery system according to claim 1, wherein the positive electrode active material layer includes a positive electrode active material coated with a lithium-containing metal oxide protective coating.

4. The all-solid-state battery system according to claim 3, wherein the lithium-containing metal oxide is lithium niobate.

5. The all-solid-state battery system according to claim 1, wherein a thickness of the solid electrolyte layer is in the range of 0.1 μm to 300 μm.

6. The all-solid-state battery system according to claim 1, wherein a median primary particle size of the alloy negative electrode active material particles is 10 μm or less measured using the laser diffraction scattering particle size distribution method.

7. The all-solid-state battery system according to claim 1, wherein the ratio Z/W is in the range of 0.37 to 0.53.

8. The all-solid-state battery system according to claim 1, wherein the amorphization degree is in the range of 35% to 75%.

9. The all-solid-state battery system according to claim 1, wherein the control device is configured to control the charge-discharge voltage to be in a range of 2.50 V to 4.40 V.

10. The all-solid-state battery system according to claim 9, wherein the control device is configured to control the charge-discharge voltage to be in a range of 3.00 V to 4.00 V.

* * * * *